United States Patent [19]

Burch

[11] 3,935,950
[45] Feb. 3, 1976

[54] INDUSTRIAL ROBOT
[75] Inventor: Arthur Robert Burch, Plainwell, Mich.
[73] Assignee: Quality Steel Fabricators, Inc., Hopkins, Mich.
[22] Filed: Sept. 4, 1973
[21] Appl. No.: 393,790

[52] U.S. Cl. .............................. 214/1 BB; 214/1 BC
[51] Int. Cl.² ......................................... B25J 9/00
[58] Field of Search .... 214/1 B, 1 BB, 1 BC, 1 CM, 214/1 BT, 1 BH

[56] References Cited
UNITED STATES PATENTS

| | | | |
|---|---|---|---|
| 3,075,651 | 1/1963 | Kaden | 214/1 BB |
| 3,668,941 | 6/1972 | Canner | 214/1 BB X |
| 3,709,379 | 1/1973 | Kaufeldt | 214/1 BB |
| 3,760,956 | 9/1973 | Burch | 214/1 BB |
| 3,765,545 | 10/1973 | Iwata | 214/1 BC X |
| 3,819,061 | 6/1974 | Andersson | 214/1 CM X |

FOREIGN PATENTS OR APPLICATIONS
955,715   4/1964   United Kingdom .............. 214/1 BC Primary Examiner—Robert J. Spar
Assistant Examiner—George F. Abraham
Attorney, Agent, or Firm—McGarry & Waters

[57] ABSTRACT

An industrial robot well suited for handling heavy work pieces comprises a base; a vertically oriented main support shaft rotatably mounted in the base on a radial thrust bearing; a support frame mounted on the support shaft; a flat-sided extendable main extend shaft mounted on the support frame; and a tooling assembly mounted on the outer end of the main extend shaft. The main extend shaft is a hollow, rectangular tubular member and rides on a simplified bearing assembly consisting of two sets of adjustable cam followers that ride on all four walls of the shaft. The tooling assembly comprises cam-operated, adjustable force grab jaws that hold the work piece; and separate means for raising and lowering and extending and retracting the grab jaws with respect to the main extend shaft. The whole system is operated hydraulically by solenoid actuated valves which control hydraulic motors or cylinders, with the cylinders functioning on a full extend or full retract basis. Limit switches and a programed sequence controller control the sequence and operation of the apparatus.

17 Claims, 13 Drawing Figures

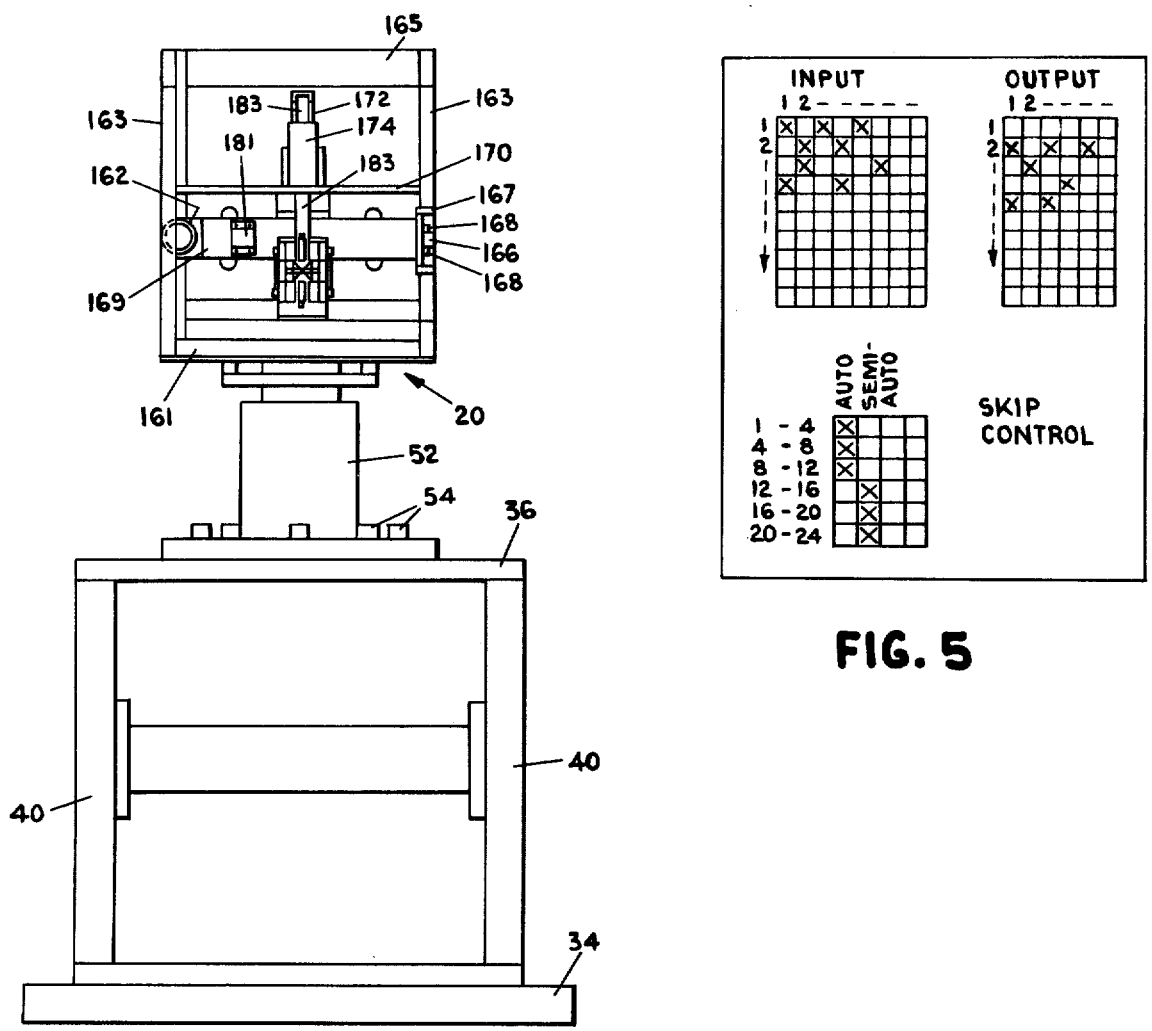
FIG. 3
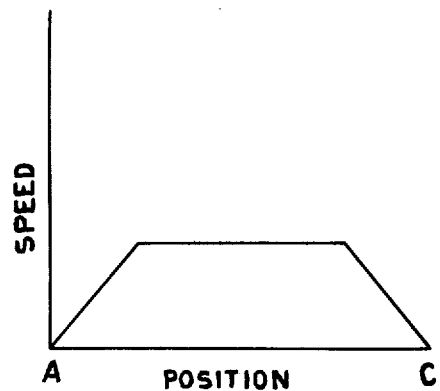
FIG. 5
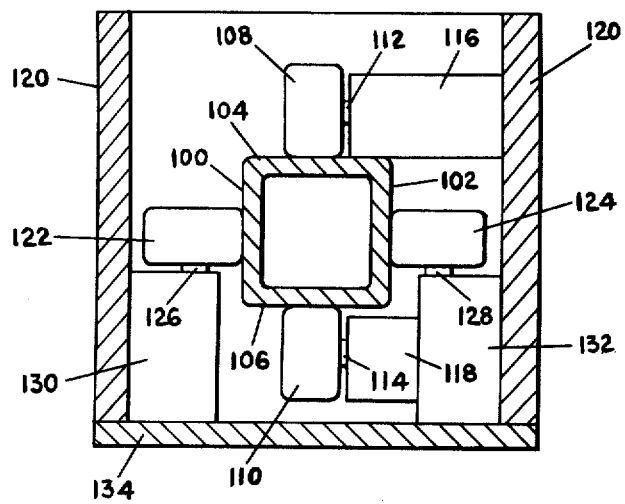
FIG. 4
FIG. 6

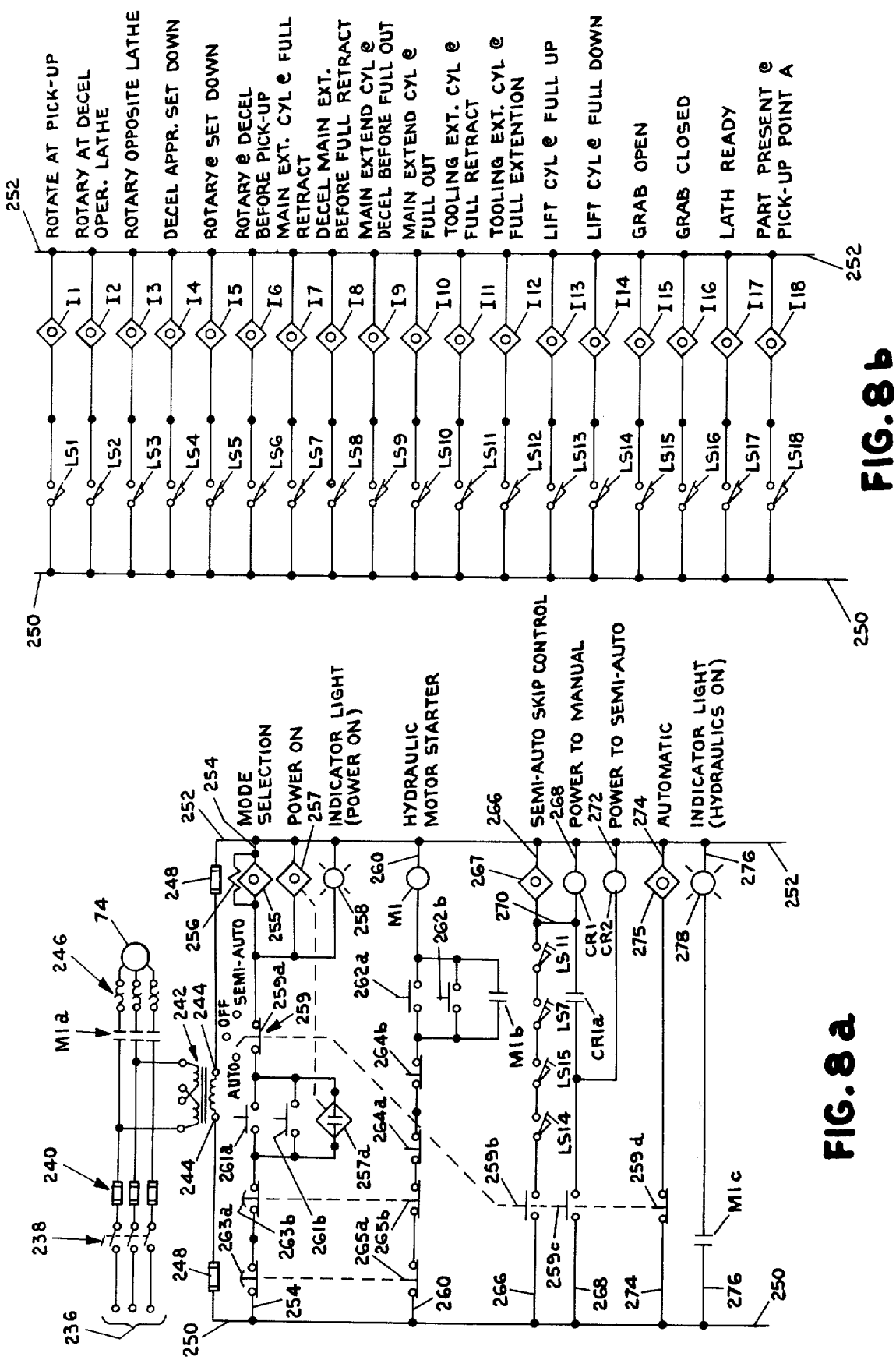

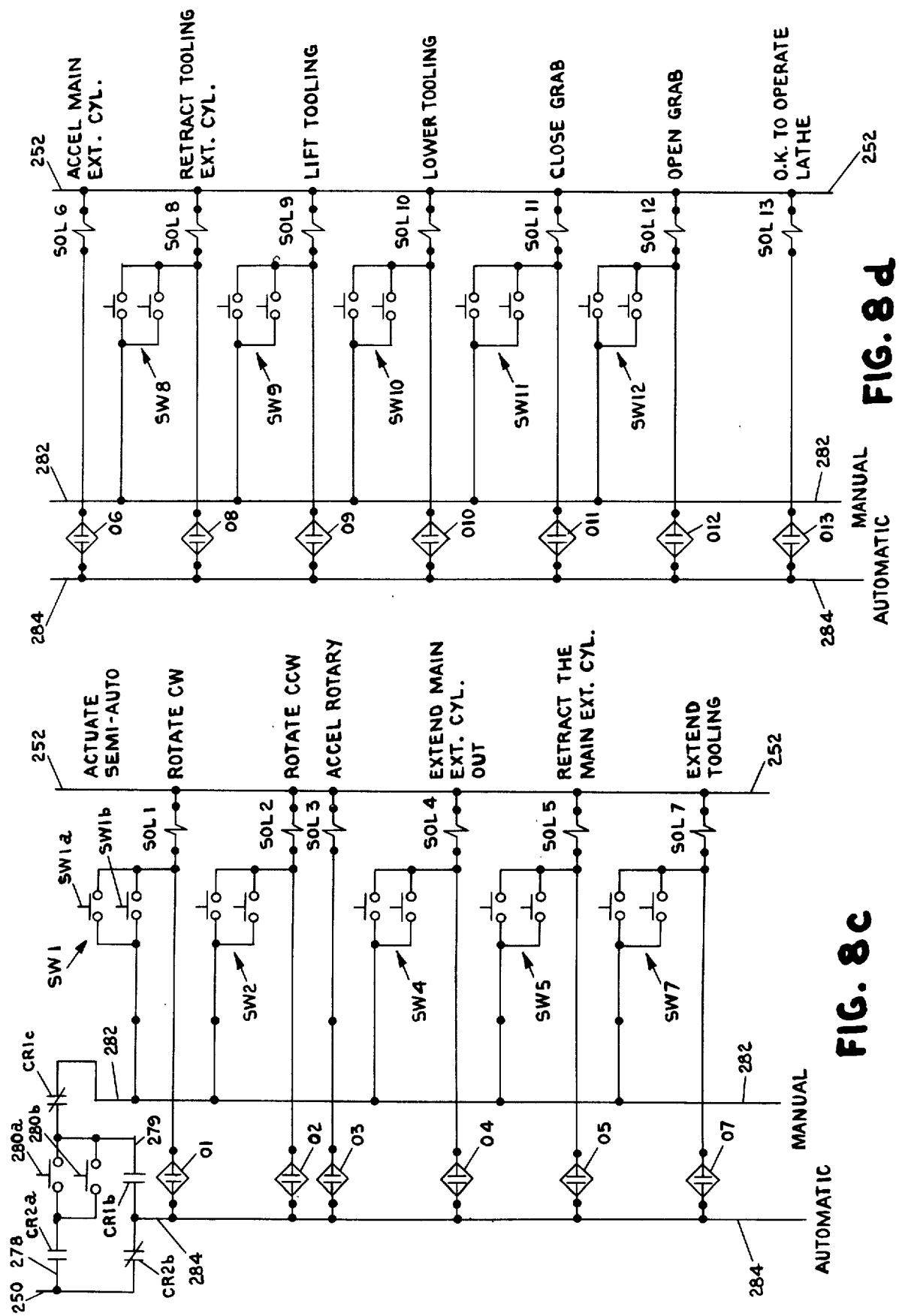

INDUSTRIAL ROBOT

BACKGROUND OF THE INVENTION

1. Field of the Invention

This invention relates generally to an industrial robot and more particularly to a simplified industrial robot having a light weight rectangular main extend shaft that is mounted for longitudinal movement on a plurality of simple adjustable cam followers.

2. Description of the Prior Art

Industrial robot is a generic name for a mechanized apparatus that has the ability to pick up a work piece, perform a work function on the work piece and place the work piece down in a different position. An industrial robot is generally considered to be a more complex structure than a conventional material transfer device which merely picks up an object such as a can or the like by means of a suction cup or other such device and moves it from one location to another location, with the starting and ending locations usually being the same distance from a central pivot axis. Typically, an industrial robot, in addition to having the ability to pick up an object and move the object to a different position with respect to a vertical axis, also has the ability to move the object to a different radius with respect to the vertical axis by means of a horizontal extend cylinder pivoted about the vertical axis. Also, some industrial robots have the ability to tilt or raise and lower the main extend cylinder so as to raise and lower the work piece handling device at the end of the main extend cylinder.

Heretofore, industrial robots have been extremely complex and expensive pieces of machinery and have accordingly been too expensive to employ in many tedious or hazardous industrial operations where profit margins are not sufficient to sustain the overhead involved in the purchase of such a machine.

One of the principal expenses involved in prior industrial robots is the extendable shaft and bearing assembly for moving a work piece to different radial distances from the vertical axis of rotation of the industrial robot. Heretofore, the main extend shafts have been expensive, machined rods, and the bearing assemblies have been elaborate and complex bearing mechanisms specifically designed and fabricated for that use. Such extend shafts and bearing assemblies have been expensive and difficult to align and have provided little or no adjustment for wear or misalignment of the extend shaft.

Another problem with main extend shafts previously employed is that typically such shafts have been cylindrical in shape, with a circular cross-section. Although closer tolerences are sometimes possible with a shaft having a circular cross-section (this seems to be the reason for employing cylindrical shafts), an important drawback with such a shaft is that a cylindrical shaft by itself possesses no resistance to torsional stresses placed on the bar. To provide adequate torsional rigidity in an industrial robot employing a cylindrical extend shaft it has been necessary in previous apparatus to either employ a pair of parallel main extend shafts spaced apart on the apparatus or to fasten an outrigger or a flat strip or key along the outside surface of the shaft and constrain rotation of the shaft by cam followers bearing on the strip. These devices naturally increase the cost and alignment and adjustment problems of the apparatus.

A further problem with prior industrial robots is that most of these robots have employed unduly expensive and inaccurate drive and control mechanisms. In hydraulic control mechanisms heretofore used, most applications have employed electronic servo valve controls in order to provide continuous variation of the rotational and extension positions of the tooling assemblies of the industrial robots. These servo valve mechanisms require complex feedback controls in order to obtain accurate positioning, and even then the systems possess inaccuracies that are impossible to overcome entirely. This is particularly true when the system is bearing a heavy load and the moving members have developed considerable kinetic energy. In such a case, it is difficult to stop and accurately position the extendable arm of an industrial robot.

In systems that employ electric drive motors for rotating and extending the tooling assemblies of an industrial robot, the same type of feedback controls are necessary in order to achieve accurate positioning, and another drawback with this type of system is that considerably less power is available with a conventional electric motor than with hydraulic controls. In order to handle the heavy tooling assembly or heavy work piece, it would be necessary to employ an extremely large and cumbersome electric motor, whereas a simple 1 ½ inch hydraulic cylinder will deliver the same power under the same situation. Accordingly, an electrically driven apparatus is inadequate for an industrial robot designed for heavy jobs.

With new federal safety standards being enacted every day, there is a need in the industrial trade for a simple and inexpensive industrial robot that can be used in hazardous material handling operations, where the use of manual labor might be unduly dangerous. Further, there is a general need for an industrial robot that can handle heavy loads and can position the loads accurately.

The present invention obviates the foregoing deficiencies of the prior art and provides a simple, inexpensive, heavy duty industrial robot that is capable of a wide variety of material handling needs.

SUMMARY OF THE INVENTION

In accordance with the present invention, an industrial robot for manipulating a work piece comprises a tooling assembly for handling the work piece mounted on a moveable manipulator. The manipulator comprises a base; a main support shaft pivotably mounted on a base for rotation about a substantially vertical axis; a support means including a support frame and bearing assembly mounted on the support shaft; and an extendable non-circular main extend shaft mounted on the support frame. The tooling assembly is mounted on the outer or front end of the main extend shaft. Selectively operable drive means rotate the main support shaft and extend and retract the main extend shaft. Control means selectively operate the drive means in proper sequence.

One of the important features of the present invention is that the main extend shaft comprises an inexpensive hollow tubular member having flat sides (preferably rectangular), and this shaft rides on a simple bearing assembly that supports the shaft at two separate points on the support frame. This bearing assembly comprises four cam followers that engage each of the four sides of the rectangular main extend shaft at each support point on the shaft. The hollow tube and cam followers are considerably cheaper than the expensive machined extend shafts and expensive bearing assemblies employed in the prior industrial robots, yet the positioning precision obtainable with the extend shaft and cam follower assembly of the present invention is as good or better than with the apparatus of the prior art.

A further advantage of the cam follower bearing assembly of the present invention is that the cam followers are eccentrically mounted on cantilevered axles, so that the positions of the cam followers with respect to the main extend shaft may be adjusted for wear and alignment. Also, the cam followers are mounted in open channel brackets that permit easy access to the cam followers for installation, adjustment, and replacement.

Another feature of the present invention is that all extendable parts are moved by means of hydraulic cylinders which move between their extreme extend and retract positions. Although this type of arrangement does not provide the complete intermediate positional flexibility of a servo valve system, the positional accuracy of this system is better than a servo system, particularly for heavy applications, and the present system is much less expensive than prior systems. Further, by using an additional extend and retract cylinder in connection with the tooling itself, additional positional flexibility is provided at little additional expense, without impairing the accuracy or simplicity of the apparatus. The hydraulic cylinders and motors are controlled by simple three position, four way spring centered valves and do not require expensive servo valves.

The industrial robot of the present invention is especially valuable for applications where heavy tooling or work pieces are to be manipulated. In order to overcome the heavy inertia forces developed by heavy work pieces or heavy tooling assemblies, the present invention incorporates hydraulic valves and control apparatus that cause the heavy elements to accelerate gradually as they start their movement and decelerate gradually as they approach their designated stopping positions. Cushioning apparatus in the form of shock absorbers are provided for safely positioning the equipment at the specific stopping locations desired in the event of a control failure.

The electrical controls employed with the present invention are likewise simple electrical controls and do not require the expensive feedback apparatus of prior systems. Simple limit switches and a programed sequence controller are employed to control the operation and sequence of all elements.

The tooling assembly mounted on the front end of the main extend shaft may be designed separately for each industrial application contemplated, and is easily removable for replacement or substitution. The tooling assembly of the present invention is designed as a general purpose tooling assembly for gripping and moving a work piece from one location to another. This tooling assembly comprises hydraulically operated gripping jaws which are actuated by a cam mechanism. This tooling assembly also includes separate vertical and horizontal extend and retract cylinders that raise and lower and extend and retract the tooling assembly itself with respect to the main extend shaft. It is an important feature that the vertical extend and retract cylinder is associated only with the tooling assembly because this means that only the grab jaws of the tooling assembly need be lowered for a desired work function, and extra energy need not be expended for raising and lowering the entire main extend shaft of the manipulator, a practice which occurred in some of the prior art industrial robots.

The use of a horizontal extend and retract cylinder in connection with the tooling assembly itself provides a similar advantage and also provides additional extension radius variation for the robot.

These and other advantages and features of the present invention will hereinafter appear, and for purposes of illustration, but not of limitation, a preferred embodiment of the present invention is described in detail below.

BRIEF DESCRIPTION OF THE DRAWINGS

FIG. 3 is a front elevational view of the industrial robot of the present invention.

FIG. 4 is a sectional view taken along line 4—4 of FIG. 1.

FIG. 5 is a pictorial view of the diode pin control board of the programed sequence controller of the present invention.

FIG. 6 is a schematic graph of the acceleration-deceleration characteristics of the apparatus of the present invention.

FIG. 7b is a schematic side elevational view of the industrial robot of the present invention, showing the various steps in the work operation depicted in FIG. 7a.

FIGS. 8a–d are schematic electrical circuits employed in the industrial robot of the present invention.

DETAILED DESCRIPTION OF A PREFERRED EMBODIMENT

Figure 1:
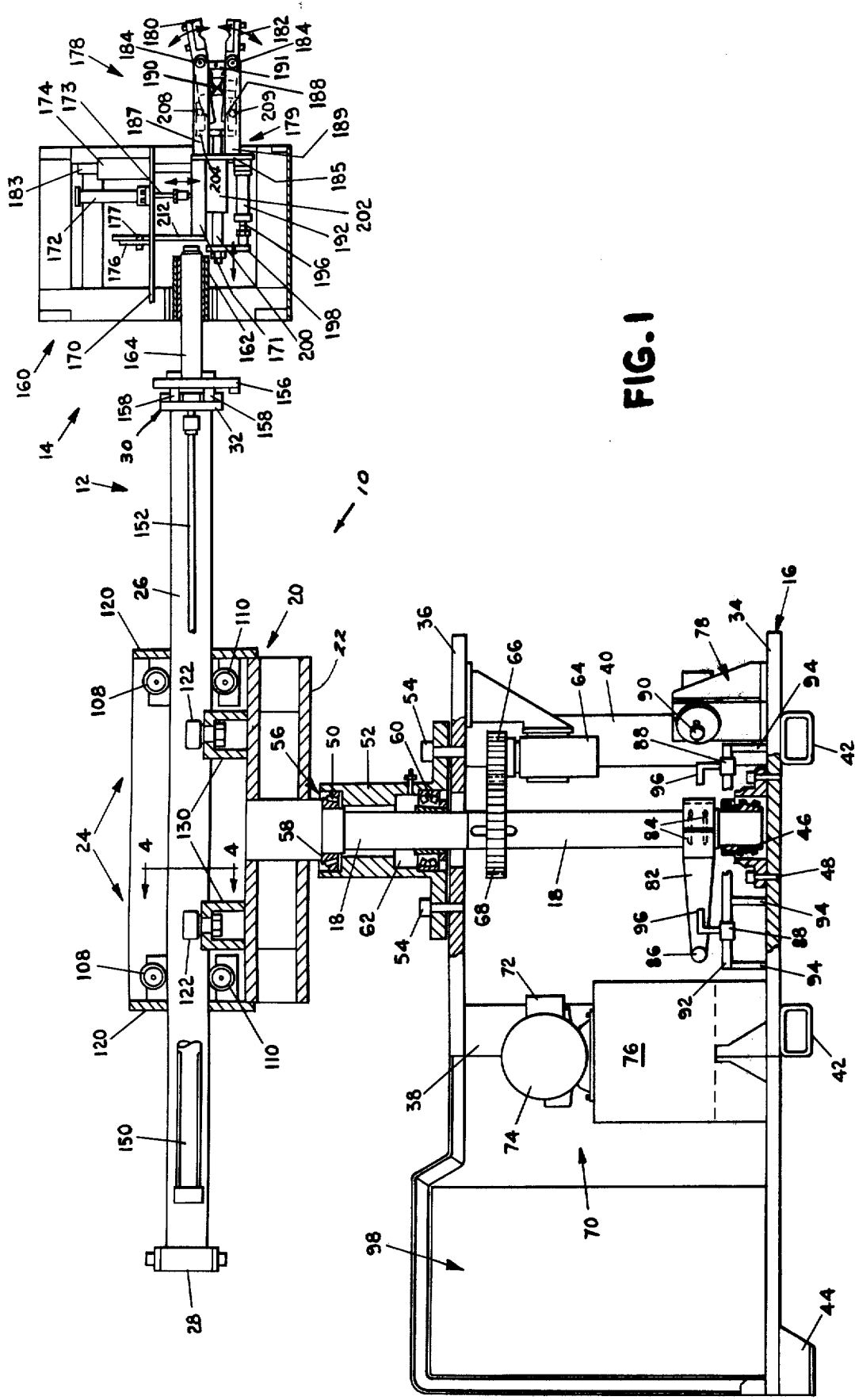
FIG. 1 is a side elevational view of the industrial robot of the present invention shown partially in section and partially broken away.

An industrial robot 10 embodying the principal features of the present invention is shown in the drawings. Industrial robot 10 comprises two principal parts, namely, a manipulator 12 and a tooling assembly 14. The manipulator is identical in all operations employing the industrial robot of the present invention, but the tooling assembly is removable, and other types of tooling assemblies could be designed and used for other types of work operations.

Manipulator 12 comprises a base 16, a main support shaft 18, a support means 20 comprising a support frame 22 and a bearing assembly in the form of a cam follower mechanism 24 mounted on the upper end of the support shaft, and a main extend shaft 26 engaged, supported, and guided by the cam follower mechanism 24 for longitudinal movement in a generally horizontal direction. It would be possible to align the support frame and the cam follower mechanism at any angle desired in order to change the angle of inclination of the main extend tube, but for most industrial operations the main extend shaft is disposed in a generally horizontal direction. Main extend shaft 26 comprises a back end 28 and a front end 30 comprising a mounting plate 32 for tool assembly 14.

Referring in more detail to the structure of manipulator 12, base 16 comprises a bottom 34, a top 36, and vertical support members 38 and 40. Bottom 34 rests on a pair of rectangular tube members 42 and a leg 44.

Main support shaft 18 is a cylindrical shaft that extends upwardly from bottom 34 through top 36 and above the top of base 16. The lower end of main support shaft 18 is housed in a bearing assembly 46 which is bolted to bottom 34 by suitable fasteners 48. Bearing assembly 46 is designed principally for engaging and supporting main support shaft 18 for rotation about its vertical axis. This bearing assembly does not include a bearing for supporting the weight of the support shaft, which is a departure from the practice of the prior art, wherein it was customary to place a separate vertical thrust bearing assembly below this support shaft in order to rotatably suspend the support shaft for rotation with respect to the floor 34 of the base.

A separate vertical thrust bearing is not necessary in the present invention because of the use of the radial thrust bearing 50 at the upper portion of the shaft. Radial thrust bearing 50 rests on a yoke 52 which is bolted by simple fasteners 54 to top 36 of the base. Radial thrust bearing 50 rests in an annular recess 56 in the top of the yoke. A radially extending collar 58 extends outwardly from main support shaft 18 at the top of the radial thrust bearing 50 and rests on the upper surface of the thrust bearing. The weight of the main support shaft and tooling mounted thereon is thus borne by the radial thrust bearing. The use of a radial thrust bearing thus provides a combination rotational bearing and vertical thrust bearing, without the necessity of a separate vertical thrust bearing at the bottom of the shaft. This contributes to the cost savings of the apparatus of the present invention, while still permitting the present invention to be used with heavier loads than industrial robots heretofore known.

An additional bearing assembly 60 is housed in a separate recess 62 in the bottom of yoke assembly 52 and provides an additional rotational bearing surface.

Main support shaft 18 is rotated by means of a main rotary drive motor 64 which is mounted on upright structural number 40 of the base. Main rotary drive motor 64 could be any conventional type of motor, but since hydraulic power is used in all other applications in this apparatus, it is convenient and advantageous to use a hydraulic motor for this purpose. The hydraulic motor 64 rotates a drive gear 66, which in turn meshes with a driven gear 68, which is mounted on main support shaft 18. This affects the rotation of the main support shaft in either direction.

Hydraulic motor 64 is capable of rotating main support shaft 18 through a total angle of 240° (see FIG. 5a). A paddle 82 (shown in FIG. 1) is bolted by means of fasteners 84 to main support shaft 18 and extends outwardly therefrom to a contact plate 86. Contact plate 86 contacts adjustable position limit switches 88, shown schematically in FIGS. 1 and 2. These limit switches cause the deceleration and stoppage of the main support shaft at desired locations within the 240° swing angle, in the manner discussed below.

Shock absorbers 78 are provided at the ends of the 240° swing angle in order to provide a backup safety precaution in the event that the limit switches fail to deactivate the motor. Without a shock absorber, if there should be a malfunction in the limit switches, it is conceivable that the main support shaft could continue to rotate about the vertical axis without stopping. Since the apparatus of the present invention is driven by hydraulic cylinders, all of which require hydraulic feed lines, continuous rotation of the main support shaft would cause the feed lines to wrap around the support shaft and eventually rupture. Continuous rotation would also result in the continuous buildup of kinetic energy and possible damage to the apparatus. It is for these reasons that a separate shock absorber 78 is employed. If the limit switches should fail to operate, contact plate 86 would strike a plunger 90 on shock absorber 78 and this would provide a soft stop for the main support shaft. A separate limit switch is incorporated into the shock absorber to effect an emergency disconnect of the hydraulic motor upon contacting the shock absorber. The shock absorber could be placed on an adjustable position track in order to serve as a hard stop at some point within the machine's 240° limit.

Limit switches 88 are moveably mounted on a circular guide rail 92, which is mounted on legs 94. Actuating arms 96 of the limit switches intersect the path of moving contact plate 86 for actuation of the limit switches.

Figure 2:
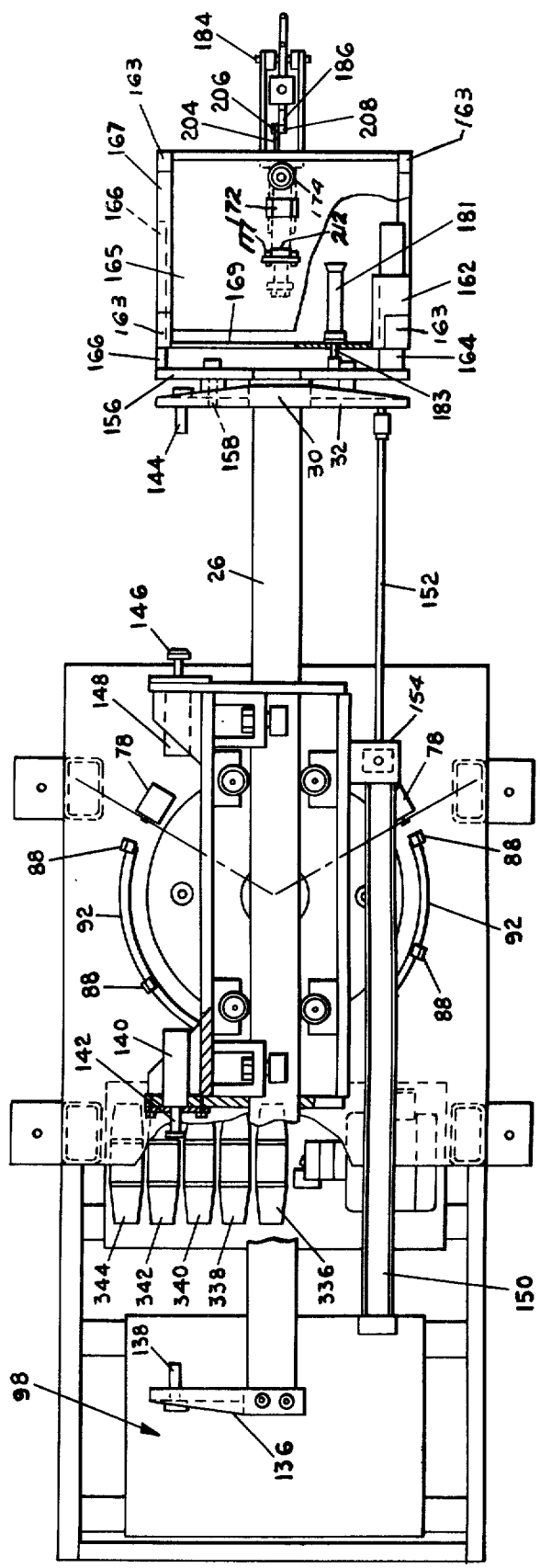
FIG. 2 is a top plan view of the industrial robot of the present invention, shown partially in section and partially broken away.

One other component mounted on base 16 is a programed sequence controller 98, which is shown in block form in FIG. 1. The controller used in the present invention is one of several possible commercially available units, and can be programed for any desired sequence of operation by means of diode pins inserted in matrix boards, a schematic diagram of which is shown in FIG. 5. In the preferred practice of the present invention, a unit available from the Square D Company has been found to be satisfactory. The operating details of this unit are disclosed in somewhat more detail below.

The heart of the manipulator of the present invention is main extend shaft 26 and the bearing assembly or cam follower mechanism 24 by which it is mounted for longitudinal movement with respect to the support frame 22. As shown in more detail in FIG. 4, main extend shaft 26 is a hollow tubular steel member having a rectangular or preferably square cross-sectional area. Main extend shaft 26 comprises vertical sides 100 and 102, a top 104, and a bottom 106. This is a conventionally available tube and need not be fabricated by any special machining process, contrary to the practice heretofore employed with industrial robots. It is necessary that the outer surfaces of this main extend shaft be machined to a smooth even surface, but this process is quite simple relative to fabrication of the entire main extend shaft by a machining process. The fact that the main extend shaft is a hollow tubular member makes the shaft light in weight and easy to handle and manipulate with the machine. This also increases the load capabilities of the machine.

An important feature of the main extend shaft of the present invention is that it is shaped so that a single shaft with no attachments or outriggers is sufficient to resist torsional stresses on the main extend shaft by an unbalanced tooling assembly or work piece. A rectangular shaft is particularly advantageous in combination with the cam follower mechanism of the present invention, but it is conceivable that other non-circular (e.g., triangular) shapes could be employed. A flat-sided shaft has the advantage of being commercially available and readily accommodates a bearing assembly of the cam follower type disclosed herein.

Cam follower mechanism 24 comprises a plurality of individual cam followers that are mounted at two separate positions in the support frame and engage and support the flat sides of the main extend shaft 26. These cam followers comprise a pair of vertical cam followers 108 and 110 and horizontal cam followers 122 and 124 at each end of the support frame. Vertical cam followers 108 and 110 engage the top and bottom, respectively, of the main extend shaft, and horizontal cam followers 122 and 124 engage the opposite sides of the main extend shaft. These cam followers support and guide the main extend shaft for longitudinal movement along the support frame, while restraining the main extend shaft from vertical, pivotal, or twisting movement relative to the support frame. Vertical cam followers 108 and 110 comprise horizontal axles 112 and 114 that are perpendicular to the longitudinal axis of the main extend shaft, and horizontal cam followers 122 and 124 comprise vertical axles 126 and 128.

Preferably, these cam followers are mounted eccentrically on their axles and include an adjustment mechanism in order to permit variation of the position of the cam followers with respect to the main extend shaft. Cam followers having an adjustment mechanism of this type are available commercially and relatively inexpensively.

The axles of the vertical cam followers are mounted in open channel brackets 116 and 118, which are in turn mounted to side walls 120 of the support frame. The axles of horizontal cam followers are mounted in open channel brackets 130 and 132, which are mounted attached to side walls 120 and bottom 134 of the support frame. The axles of the cam followers extend through the channel brackets and are bolted to the channel brackets by nuts that fit on threaded inside ends of the axles. The channel brackets provide easy access to these nuts for easy position adjustment or installation or removal of the cam followers.

All of the cam followers of the present invention are identical and all are commercially available. These cam followers are simply cantilevered bearings comprising wheels rotatably mounted on axles and the definition of the term cam followers herein is intended to encompass structures of this type whether called cam followers or not. Cam followers sold by McGill Company under the brand name "Camrols" are satisfactory for the purposes of the present invention, although other brands undoubtedly would also work.

The wheels of the cam followers have flat outer perifery that snugly engage the flat walls of the main extend shaft on all four sides thereof so as to provide both the support and accurate guidance for the extension and retraction of the main extend shaft. These cam followers are relatively inexpensive when compared to bearing assemblies used previously, but they are extremely accurate and extremely sturdy. In fact, the industrial robot of the present invention is designed to support a load of 4,000 foot pounds on the cam follower mechanism without injury to the mechanism.

Although cam followers of the type described herein are a highly desirable type of bearing because of their simplicity and inexpensiveness and their particular adaptability to a flat-sided main extend shaft, it is conceivable that other types of bearing assemblies such as needle or roller bearing assemblies could be adapted to support and guide the rectangular main extend shaft of the present invention by providing similar bearing surfaces on all four sides of the shaft at two different support points on the support frame.

The left hand end 28 of the main extend shaft 26 is provided with a stop plate 136 that extends outwardly therefrom. A travel adjustement screw 138 is threaded into the end of stop plate 136 in alignment with a shock absorber 140 mounted on support frame 22. Shock absorber 140 comprises a plunger 142 that engages travel adjustment screw 138 upon the completion of the full extension of main extend shaft 26 and actuates a limit switch stopping the movement of the main extend shaft at substantially full extension. Travel adjustment screw 138 may be adjusted to provide minor distance adjustments in the stroke of the main extend cylinder.

Similar to the travel adjustment screw and stop plate on the left end of main extend shaft 26, a travel adjustment screw 144 is also provided in mounting plate 32 on the right hand or front end of the main extend shaft, and this screw is in alignment with a plunger 146 of a shock absorber 148 mounted on the support frame. The engagement of plunger 146 also actuates a limit switch which cuts off the retraction of the main extend shaft at that substantially full retraction. Travel adjustment screw 144 may similarly be adjusted to provide some variation in the retraction stroke of the main extend cylinder, but the stroke is still substantially full extension and full retraction.

Main extend cylinder 26 is extended and retracted by means of a hydraulic main extend cylinder 150 which comprises an extendable shaft 152 extending therefrom into contact with the mounting plate at the front end of the main extend shaft. Hydraulic cylinder 150 is mounted to the support frame by means of brackets 154.

Tooling Assembly

Having thus described the basic structural features of the manipulator of the present invention, attention will now be directed toward the structure of the tooling assembly 14 of the present invention. For the present time, detailed discussion of the hydraulic and electrical drive and control mechanism are deferred until the structure of the apparatus has been fully described.

Tool assembly 14 comprises a mounting plate 156 rigidly fastened to the mounting plate 32 of the main extend shaft by means of suitable fasteners 158 or the like. A support shaft 164 extends outwardly from mounting plate 156 at one side thereof, and a guide rail 166 extends outwardly from the other side of the mounting plate.

A moveable carriage 160 is moveably mounted on mounting plate 156 for longitudinal movement away from the end of the main extend shaft.

Moveable carriage 160 comprises a rectangular base plate 161 having four vertical support beams 163 extending upwardly from the corners thereof to a top 165 mounted on the top of the supports. A back plate 169 extends between the two back vertical supports opposite mounting plate 156. A bearing sleeve 162 is mounted on back plate 169 at one side of the carriage and slideably fits over support shaft 164. A channel member 167 runs laterally along the other side of the moveable carriage parallel to guide rail 166 on the mounting plate, and cam followers 168 are mounted on the outside of the channel member so as to ride on the top and bottom surfaces of the guide rail and thereby support that side of the moveable carriage.

The moveable carriage is slideable longitudinally outwardly along support shaft 164 and guide rail 166 by means of a hydraulic tooling extend cylinder 181 mounted on back plate 169. Tooling extend cylinder 181 comprises a hydraulically operated extendable rod 183 that extends through the back plate and is attached to the mounting plate. Extension of this rod thus causes the carriage to move outwardly with respect to the mounting plate, while retraction of the rod causes the carriage to move inwardly with respect to the mounting plate.

Moveable carriage 160 includes a flat, horizontally disposed mounting plate 170 fastened to the vertical supports at a point above the bottom of the carriage. A vertically disposed lift cylinder 172 is mounted on the top surface of the mounting plate and comprises an extendable rod 173 that extends downwardly from the cylinder through the mounting plate to a lower end positioned below the mounting plate. A bearing sleeve 174 and a guide bracket 176 comprising horizontally spaced cam followers 177 also are mounted on the top of the mounting plate.

The actual work contacting mechanism of the tooling assembly is a grab jaw mechanism 178 mounted under the lift cylinder mounting plate for vertical movement with respect to the moveable carriage. The grab jaw mechanism comprises a pair of opposed upper and lower jaws 180 and 182, respectively, that are pivotably mounted in a frame 179 and are opened and closed by a hydraulic cylinder 192.

Frame 179 comprises a base 171, which is attached to and suspended from the lower end of the extendable arm of the hydraulic tooling lift cylinder, and a vertical alignment shaft 183 that rides in sleeve 174. A vertical guide rod 212 also extends upwardly from the frame and rides between cam followers 177 on guide bracket 176. The alignment shaft and guide rod hold the grab jaws in vertical alignment even though a particular work piece lifted by the grab jaws may be unbalanced.

A rectangular vertical mounting plate 185 is attached to the front of base 171 and extends downwardly therefrom. Upper and lower pairs of parallel grab jaw support arms 187 and 189 extend outwardly from plate 185 and pivotably support jaws 180 and 182 by means of axles 184 that extend between each pair of arms. Links 191 holds the outer ends of the support arms vertically apart. Axles 184 are horizontally disposed, so that the pivotal motion of the grab jaws is in a vertical plane.

Each jaw is pivoted at a point between the ends thereof, with a front portion of the jaws comprising gripping surfaces for holding a work piece and the back portion of the jaws comprising cam surfaces 186 and 188 that taper inwardly toward a point at the back of the grab jaws. An adjustable spring mechanism 190 shown in schematic form in the drawings is interposed between the two pivotable grab jaws behind axles 184, and this spring mechanism resiliently urges the grab jaws toward their closed positions, that is, the position where the grab jaws are clamped together on a work piece in holding position.

Grab jaw mechanism 178 is opened and closed by means of grab jaw cylinder 192 mounted on the back side of vertical mounting plate 185 and comprising an extendable shaft 196 that extends rearwardly therefrom into contact with a vertical drive plate 198. Vertical drive plate 198 is in turn fastened to a horizontal support shaft 200. Horizontal support shaft 200 is journaled in a bearing sleeve 202 attached to vertical mounting plate 185 and extends through bearing sleeve 202 and plate 185 to vertical link 204 adjacent the back end of the grab jaws. Arms 206 extend outwardly from the link, and cam followers 208 and 209 are mounted on the ends of these arms so as to contact cam surfaces 186 and 188, respectively, on the backs of jaw members 180 and 182.

When grab jaw cylinder 192 is retracted, so that extendable shaft 196 is retracted into the cylinder, horizontal support shaft 200 is moved to the right in a longitudinal direction with respect to the grab jaws, thus forcing cam followers 208 and 209 into engagement with cam surfaces 186 and 188. This in turn causes the grab jaws to pivot to an open position. When the direction of the grab jaw cylinder is reversed and shaft 196 is extended, cam followers 208 move out of contact with the cam surfaces on the grab jaws and the grab jaws close automatically under the resilient force of the spring mechanism 190. Adjustment of spring mechanism 190 is desirable so that the force of the grab jaws on the work piece can be adjusted.

Upward and downward movement of the grab jaws is effected by lift cylinder 172. Since the grab jaws are suspended from the end of extendable rod 173, the actuation of lift cylinder 172 and the extension and retraction of this extendable rod causes the grab jaw assembly to raise and lower with respect to the rest of the tooling assembly. The provision of a separate lift cylinder in the tooling assembly is an important advantage of the present invention, in that it permits the tooling to be raised and lowered with respect to a work piece without also raising the entire manipulator. Because it is not necessary to raise the entire manipulator, a smaller and more compact lift cylinder can be employed than would otherwise be required.

Controls

The complete range of functions available with the apparatus of the present invention are:

i. rotation of the vertical support shaft in both directions through an angle of 240°;

ii. extension and retraction of the main extend cylinder;

iii. extension and retraction of the tooling extend cylinder;

iv. extension and retraction of the tooling lift cylinder (i.e., raising and lowering of the tooling); and v. extension and retraction of the grab jaw cylinder (i.e., closing and opening the grab jaws).

In the present invention, all of these functions are performed by a hydraulic drive means, with the rotation of the vertical support shaft being accomplished by a hydraulic motor and the rest of the functions being accomplished by hydraulic cylinders. Each hydraulic drive means is operated by means of a simple solenoid operated four way, three position hydraulic valve, with the actuation of these valves being controlled by appropriate limit switches.

The hydraulic motor is adapted for rotation through an angle of 240°, and the hydraulic cylinders are adapted to operate on a full extend and full retract basis. The full extend and full retract feature permits accurate positioning of the apparatus without the use of expensive servo valves.

For heavier components of the apparatus, namely, the rotary drive mechanism and the main extend shaft drive mechanism, appropriate hydraulic controls (described below) are employed to provide both acceleration and deceleration of these components, in order to avoid damage to the machinery or control mechanism by an abrupt change in kinetic energy of these components.

The operation of the industrial robot of the present invention may be performed in any order automatically by means of programed sequence controller 98. The preferred programed sequence controller employed in the present invention is available commercially from Square D Company, but several other types of units could be employed for this purpose, as well.

Programed sequence controller 98 receives input signals by means of appropriate starter buttons and limit switches connected to the industrial robot, and in response to these input signals, the controller generates output signals that effect the operation of the robot by means of the solenoid-operated hydraulic valves. The operation of the controller is effected by means of diode pins which are selectively placed in input and output matrices of a control board of the type shown schematically in FIG. 5. In this figure, separate input and output matrices are provided for establishing the sequence and operation of the machine, and a skip control matrix is provided for skipping certain steps in various modes of operation that may be selected (e.g., automatic or semi-automatic operation). In the input control matrix, each horizontal row represents a separate step in the sequential operation of the industrial robot, while each vertical column represents a separate limit switch. The output matrix is similarly sub-divided, except that each vertical column represents a solenoid instead of a limit switch.

In programing the controller for operation, diode pins are first inserted in the first row of the input matrix for each limit switch that must be satisfied or actuated before the machine will operate. Diagramatically, the insertion of a diode pin in FIG. 5 is represented by an "X" in the appropriate matrix square. These limit switches, when satisfied, indicate that the machine is in its ready to run position.

After the machine is in its ready to run position, the machine will automatically perform the functions indicated in the second row of the output matrix, so the first step in programing the controller is to designate the first step to be performed by the machine by inserting diode pins in appropriate locations in the first row of the output matrix. This will effect actuation of designated solenoids.

The second step proceeds until limit switches indicated in the second row of the input matrix are satisfied, at which time the second output step is terminated and the controller automatically proceeds to the third output step. This procedure continues until the entire cycle has been completed, and then, if so programed, the cycle is automatically repeated.

In order to increase the versatility of the controller, means are provided to operate the controller in different modes of operation, wherein certain of the steps indicated in the input and output matrices may be skipped. This function is effected by means of a "skip control matrix", which is shown schematically in FIG. 5. Each row of this matrix represents individual steps or groups of steps, and each column represents a separate mode of operation. The insertion of a diode pin into any given step causes that step to be skipped in that mode, while the elimination of a diode pin causes that step to be included.

In the present invention, the robot may be operated in one of two modes, namely, automatic or semi-automatic. In automatic mode, all of the steps of a given sequence are performed and repeated automatically, while in the semi-automatic mode, certain of these steps must be performed manually (i.e., by manually actuating a solenoid to effect a given operation). The purpose of this semi-automatic mode is to enable an operator to place the machine in a ready to run position ss soon as possible after an interruption in the normal automatic mode of the machine, without having to first let the machine complete a full automatic cycle.

Figure 7A:
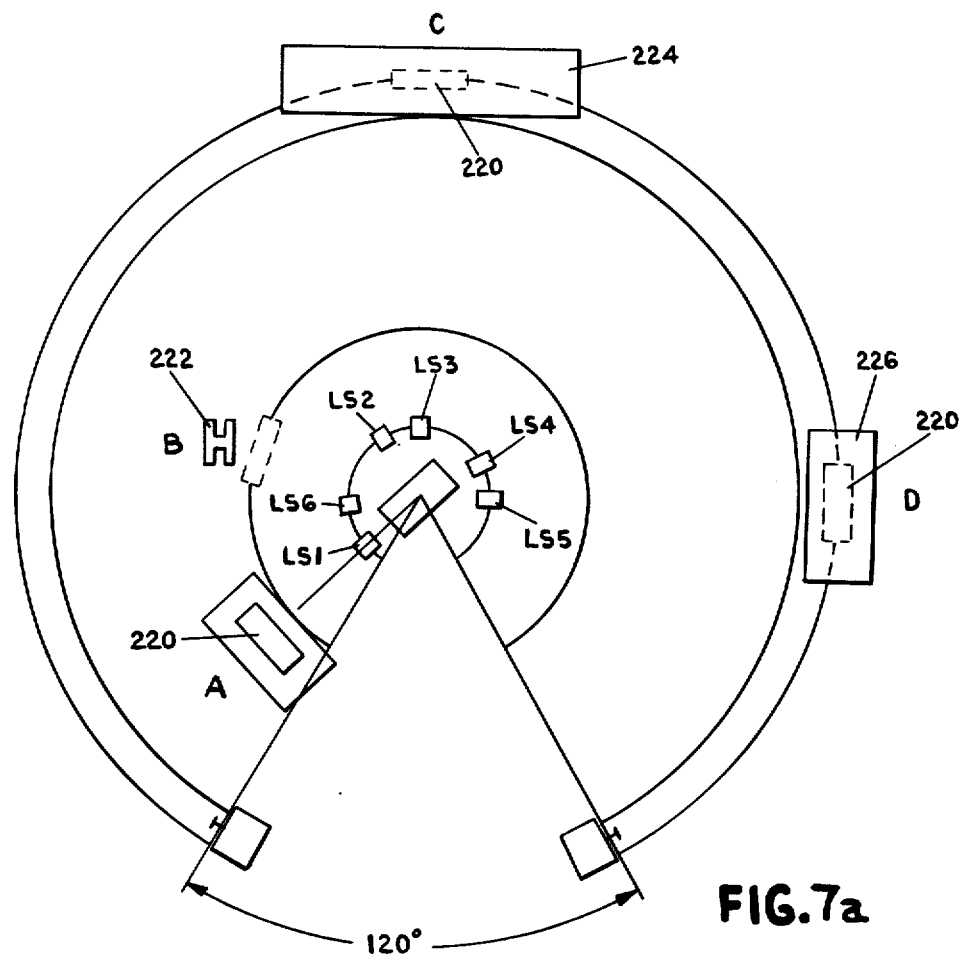
FIG. 7a is a schematic plan view of a work operation that might be performed by the industrial robot of the present invention.
Figure 7B:
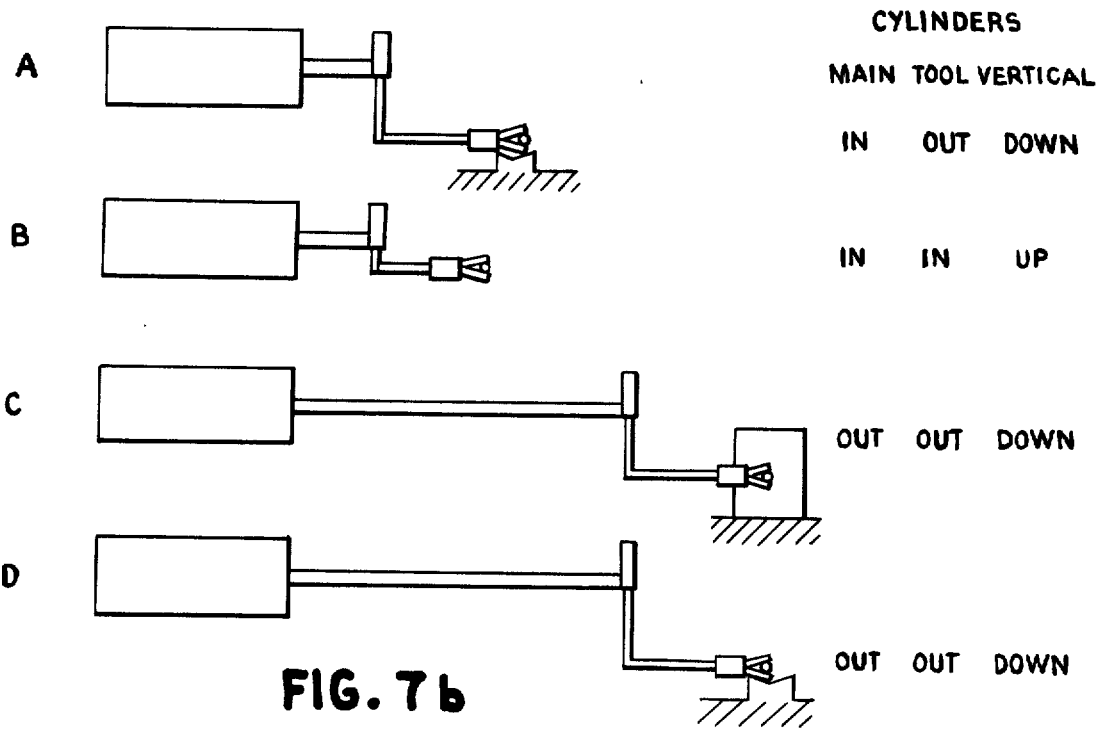

To exemplify the types of controls that might be employed in the present invention, the following input limit switches and output solenoids are employed in the exemplary lathe operation shown in FIGS. 7a and 7b:

| Input Limit Switches | Function |
|---|---|
| LS 1 | Rotary switch opposite pickup point A. |
| LS 2 | Rotary switch at deceleration point before lathe (point C). |
| LS 3 | Rotary switch opposite lathe (point C). |
| LS 4 | Rotary switch at deceleration point before set down point D. |
| LS 5 | Rotary switch at set down point D. |
| LS 6 | Rotary switch at deceleration point before pickup point A. |
| LS 7 | Main extend cylinder switch at full retract. |
| LS 8 | Main extend cylinder switch at deceleration point before full retract. |
| LS 9 | Main extend cylinder switch at deceleration point before full extend. |
| LS 10 | Main extend cylinder switch at full extension. |
| LS 11 | Tooling extend cylinder at full retract. |
| Input Limit Switches | Function |
| LS 12 | Tooling extend cylinder at full extension. |
| LS 13 | Tooling lift cylinder at full retract (up position). |
| LS 14 | Tooling lift cylinder switch at full extension (down position). |
| LS 15 | Grab cylinder switch at full retract (grab open). |
| LS 16 | Grab cylinder switch at full extend (grab closed). |
| LS 17 | Lathe ready to operate. |
| LS 18 | Work piece at pickup point. |
| Output Solenoids | Function |
| SOL 1 | Rotate main support shaft clockwise. |
| SOL 2 | Rotate main support shaft counterclockwise. |
| SOL 3 | Accelerate rotary movement of main support shaft. |
| SOL 4 | Extend main extend cylinder. |
| SOL 5 | Retract main extend cylinder. |
| SOL 6 | Accelerate main extend cylinder movement. |
| SOL 7 | Extend tooling extend cylinder. |
| SOL 8 | Retract tooling extend cylinder. |
| SOL 9 | Retract tooling lift cylinder (raise tooling). |
| SOL 10 | Extend tooling lift cylinder (lower tooling). |
| SOL 11 | Extend grab cylinder (close grab jaws). |
| SOL 12 | Retract grab cylinder (open grab jaws). |
| SOL 13 | Ready signal to operate. |

The placement and operation of each of the limit switches and solenoids is discussed in detail with the following descriptions of the operation of the robot of the present invention in these circumstances and the electrical and hydraulic circuits employed for this operation.

Exemplary Operation

An exemplary operation of the industrial robot of the present invention is shown in FIGS. 7a and 7b. FIG. 7a shows a top plan view of the rotary and extend movements of the apparatus, while FIG. 7b shows a schematic side view of the extend, lift, and grab operations of this apparatus. FIG. 7b includes a graph showing the positions of the main and tooling extend cylinders and the tooling lift cylinder at each position shown in FIG. 7a.

In FIG. 7a, the overall operation is to include: picking up a work piece 220 at position A; moving the work piece past an obstruction or building structural member 222 at position B; inserting the work piece in a lathe 224 at position C; removing the work piece from the lathe and placing it down on a set down block 226 at position D. The robot then returns to position A and starts over again.

At starting position A, the main and tooling extend cylinders are first in their retracted positions and the vertical lift cylinder is in its extended (lowered) position, and the grab jaws are open. This is the ready to operate position.

The first step is the extension of the tooling extend cylinder and the closing of the grab jaws on the work piece. This will actuate limit switches LS 12 and 16.

When these limit switches have been actuated, the work piece is lifted and the tooling extend cylinder is retracted. This will actuate limit switches LS 11 and 13.

The robot is then rotated to position C. As it commences movement from position A, hydraulic circuit means described below automatically accelerate the apparatus to a constant speed, and as the apparatus approaches position C, it first trips limit switch LS 2, which decelerates the apparatus, and then trips limit switch LS 3, which stops the apparatus opposite the lathe. A schematic graph of speed versus position, showing the acceleration-deceleration features of this invention, is shown in FIG. 6.

At position C, the main and tooling extend cylinders are extended; then the work piece is lowered and the grab jaws released, dropping the part into the lathe. The tooling extend cylinder is then retracted to get the tooling out of the way during the lathe operation.

When the lathe operation is completed, the tooling extend cylinder is extended and the grab jaws are closed on the work piece. The work piece is then lifted out of the lathe, the tooling extend cylinder retracted, and the robot rotated to set down point D. At set down point D, the tooling is extended and lowered and the grab jaws opened, dropping the work piece at that point.

The tooling and main extend cylinders are retracted at that point and the robot rotated counterclockwise to original pick up point A. When limit switch LS 18 indicates that a new part is ready for operation, the cycle described above is repeated.

Electrical Circuit

The electrical controls for the operation described above are shown in FIGS. 8a–d.

In FIG. 8a, a conventional 460 volt, 3-phase, 60 hertz power supply 236 is connected through a ganged master switch 238 and fuses 240 to a transformer 242, which converts the voltage to conventional 115 volt, single phase voltage across terminals 244. Power source 236 is also connected through motor relay switches M1a and fuses 246 to hydraulic pump motor 74.

The 115 volt line voltage produced at the output terminals 244 of the transformer is connected through fuses 248 to lines 250 and 252. All of the components shown in FIGS. 8a–d are driven by this line voltage appearing across lines 250 and 252.

A first branch 254 connected across lines 250 and 252 comprises mode selection circuitry for selecting the mode to be followed by the programed sequence control 98 of the present invention. Line 254 includes an input signal converter 255 connected in parallel with a resistor 256. Input signal converter 255 is a solid state relay coil that is adapted to receive an input signal at line voltage (i.e., 115 volts) and transmit a corresponding 24 volt logic signal to the controller. Input signal converter 255, when actuated, transmits a signal to the controller and turns the controller on. Another signal converter 257 is connected in parallel with single converter 255, and an indicator ight 258 is connected in parallel with both of these elements. Signal converter 257 is called a "Reed relay" and actuates a holding contact 257a, described below. The light provides a visible indication that the controller is turned on.

Indicator light 258 and signal converters 255 and 257 are connected in series with a mode selection switch 259, which is moveable between three positions, namely, automatic, off, and semi-automatic, the operation of each mode being described in detail below. The mode selection switch includes a pair of contacts 259a in branch 254. A pair of controller power switches 261a and b, are connected in series with mode selection switch 259, with one switch being mounted on the controller and the other switch being spaced apart from the controller for remote operation of the apparatus. Holding contact 257a actuated by input signal converter 257 is connected in parallel with these switches and holds the controller in operation after one of the controller power switches 261a or b has been actuated and the contact is broken. A pair of series connected emergency stop switches 263a and b complete branch 254, with separate switches being provided for local and remote control of the apparatus.

A second branch 260 connected across lines 250 and 252 is for actuating hydraulic motor 74 and comprises a motor relay M1 in series with a pair of hydraulic start switches 262a and 262b (one being for local and one for remote control operation), and two series connected hydraulic stop switches 264a and 264b, again for direct and remote control operation of the system. Branch 260 also includes in series a second set of contacts 265a and b operatively connected to emergency stop switches 263a and b. A holding contact M1b actuated by motor relay M1 is connected across start switches 262a and b in order to hold the contacts in an "on" position after the switch contacts are broken. When motor relay M1 is actuated by depressing hydraulic start button 262a or b, contact M1b automatically closes and completes the circuit, even though start buttons after actuating the motor relay are returned to their unactuated positions.

A third branch 266 connected across lines 250 and 252 operates the semi-automatic skip control and includes an input signal converter 267 for actuating the input skip control and limit switches LS 14, LS 15, LS 7, and LS 11 connected in series. This branch also includes a switch 259b operated by mode control switch 259 in branch 254. This switch is open when the mode switch is in its automatic or off position and is closed when the mode switch is in its semi-automatic position, thus actuating the semi-automatic mode in the skip control matrix.

The next branch connected across lines 250 and 252 is a branch 268 which provides power to the manual controls that are operated in conjunction with the semi-automatic mode of the apparatus. Line 268 includes a control relay CR1 connected in series with normally open contacts for CR1a for control relay CR1. The branch also includes a switch 259c actuated by the mode control switch 259. Switch 259c is open and closed in the same sequence as switch 259b (i.e., open in the off and automatic position but closed in the semi-automatic position). A separate line 270 extends between lines 266 and 268 from a point between the limit switches and the input signal converter on line 266 to a point on line 268 between control relay CR1 and its contacts CR1a. Another line 272 extending from line 252 to line 268 between switches 259c and CR1a includes relay CR2 and is adapted to provide power for the semi-automatic mode.

Another branch connected across lines 250 and 252 is a branch 274 which is designated to actuate the automatic sequence mode of the present invention. Branch 274 includes an input signal converter 275 for actuating the automatic mode of the sequence controller and a switch 259d, which is actuated by mode control switch 259 of branch 254. Switch 259d is closed when the switch is in its automatic mode and is open when the switch is in either its off or semi-automatic mode.

A final branch connected across lines 250 and 252 in FIG. 8a is branch 276 which actuates a hydraulic power indicator light 278 when the hydraulics are turned on. Hydraulic indicator light 278 is in series with motor relay contacts M1c and is thus operated when the hydraulic motor relay M1 is actuated by pressing hydraulic start button 262 a or b.

All of the limit switches LS 1–18 of the present invention are also connected to the 115 volt line voltage present across lines 250 and 252. This configuration is shown in FIG. 8b. Each of the limit switches LS 1-18 identified above in the foregoing chart is shown connected across lines 250 and 252 in series with a corresponding input signal converter I 1-18. Whenever any one of these limit switches is closed, this actuates an input signal converter with the 115 volt line voltage. The input signal converter then generates a 24 volt logic signal in the controller corresponding to the actuated limit switch.

The output controls of the electrical circuitry of the present invention are shown in FIGS. 8c and 8d. The output solenoids of the present invention (i.e., the solenoids that actuate the various hydraulic valves of the industrial robot) are connected across lines 250 and 252 and are therefore driven by the 115 line voltage applied to the system. The solenoids are connected for automatic operation through appropriate output signal converters 0 1–13 to a line 284 that is connected to line 250 through a normally closed pair of contacts CR2b that are operated by control relay CR2. The output signal converters are in effect relay switches that actuate elements in the 115 volt operation circuit in response to 24 volt logic signals received from the controller.

The solenoids are connected for manual operation through manually operable switches SW 1, 2, 4, 5, and 7–12 (each comprising a pair of parallel connected switches, one for local and one for remote control) to line 282. Line 282 is connected to line 250 by a line 278 that includes a semi-automatic actuation button 280 (comprising a main switch 280a and a remote control switch 280b); a normally closed relay switch CR1c actuated by control relay CR1; and a normally open relay switch CR2a actuated by control relay CR2. A line 279, including relay switch CR1b (actuated by control relay CR1) extends between line 282 and line 284.

In order to actuate the solenoids by means of the output signal converters in an automatic mode, switch 259 is placed in its automatic mode, which closes switches 259a and 259d and leaves open switches 259b and 259c. This leaves control relays CR1 and CR2 in a de-actuated state. With control relays CR1 and CR2 in a de-actuated state, relay switch CR2a is left in a normally open position and a relay switch CR2b is left in a normally closed position, so line 250 is connected directly to line 284 and is isolated from line 282. Therefore, the line voltage appears between line 284 and line 252, driving the operating solenoids of the apparatus by means of the output signal converters.

When the apparatus is to be driven in a semi-automatic mode, the mode switch 259 is turned to the semi-automatic position, wherein switches 259a–c are closed and 259d is open. The closing of these switches automatically actuates control relay CR2, but the actuating of control relay CR1 is dependent upon the closing of limit switches LS 14, 15, 7, and 11, which are, respectively, the limit switches that indicate that the tooling lift cylinder is in its lowered position; that the grab cylinder is open; that the main extend cylinder is fully retracted; and that the tooling extend cylinder is fully retracted. If, at the outset, one or more of these limit switches is not closed, when mode switch 259 is placed in a semi-automatic position, only control relay CR2 is actuated. This opens switch CR2b and closes switch CR2a, thus connecting line 250 to line 282 through switch 280 and disconnecting line 250 from line 284. With the circuitry in this state, the manual switches are enabled, and by depressing at the same time a manual switch and the semi-automatic mode actuation switch 280, individual solenoids can be actuated in order to place the apparatus in its ready to run position. When the manual switches have been actuated sufficiently in order to close limit switches LS 14, 15, 7, and 11, control relay CR1 is closed and this closes control relay switch CR1a, CR1b and opens control relay switch CR1c. This action disconnects line 282 and connects line 284 to line 250 through semi-automatic actuation switch 280. With the switches in this position, when switch 280 is closed, the the automatic steps in the semi-automatic mode are automatically performed through designated output signal converters.

Hydraulic Circuits

Figure 9:
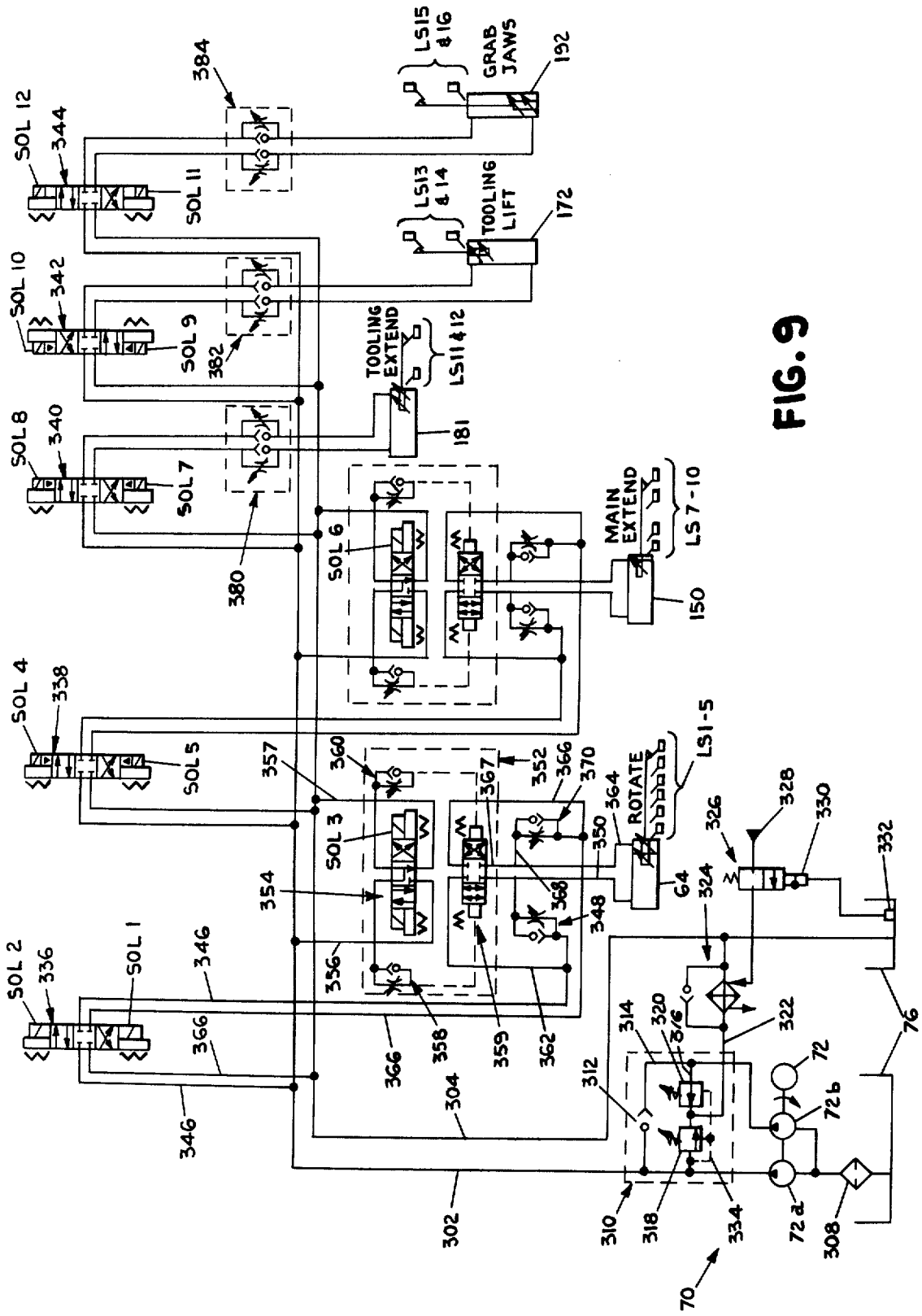
FIG. 9 is a schematic diagram of the hydraulic circuit of the industrial robot of the present invention.

The hydraulic circuitry of the present invention, as set up to perform the exemplary operation shown in FIG. 7, is shown in FIG. 9. Hydraulic drive mechanism 70 at the lower left hand corner of the drawing is connected through appropriate hydraulic valve mechanisms to actuate hydraulic motor 64, main extend cylinder 150, tooling extend cylinder 181, tooling lift cylinder 172, and grab jaw cylinder 192. Each of the hydraulic operations performed by hydraulic drive mechanism 70 is connected in parallel across conduits 302 and 304, with conduit 302 being a supply conduit and conduit 304 being a return conduit.

Starting at the lower left hand corner of the drawing, hydraulic fluid is withdrawn from reservoir 76 through inlet conduit 302. The hydraulic fluid passes through a filter 308 and is pumped by means of pumps 72a and 72b through a high-low pump control valve 310 to the hydraulic apparatus of the present invention. Motor 74 turns pumps 72a and 72b in parallel, with pump 72a being a relatively low power pump and pump 72b being a substantially more powerful pump. During operation of the hydraulic apparatus of the present invention under low load conditions, pump 72a does all of the pumping, while pump 72b is effectively free wheeling, thus conserving pump 72b for heavy load conditions.

A conduit 314 extends between the output of pump 72b and line 302 at the output of the high-low pump control valve through a check valve 312 that prevents fluid from passing from pump 72b to line 302 through the check valve. A line 316 extends between lines 302 and 314 and includes a pair of series connected, adjustable pressure sensitive valves 318 and 320. A conduit 322 for routing hydraulic fluid through a water cooler and back to the reservoir is connected to the high-low pump control valve between the pressure sensitive valves. Conduit 322 runs through a water cooler 324 and then is connected to return conduit 304 which leads back to reservoir 76. Water is provided to the water cooler through a water control valve 326 from a water outlet tap 328. The water supply is regulated by a temperature sensor 330 that is actuated by a temperature probe 322 in the reservoir.

The operation of the high-low pump control valve in regulating pressure to the hydraulic system is as follows. When the hydraulic system is using only a small amount of hydraulic pressure, the main pump 72a is sufficient to provide all of the hydraulic pressure required for operation. The auxiliary pump 72b thus is in its free wheeling condition and requires no power for operation.

When the line pressure in conduit 302 drops below a predetermined value (e.g., 1,000 psi) upon placing a heavy hydraulic load on the system, valve 320 causes the output of pump 72b to be connected to line 302 through line 334. Thus, the output of pump 72a and 72b are joined and the full output of bothh pumps is connected to the hydraulic system. The advantage of this feature is that it is not necessary for a full power hydraulic pump to be operated at small load levels where the full pump capacity is not required. Rather, only the small pump need be operated for small loads and the full pumping capacity can be reserved for times when the full capacity is needed. This saves wear and tear on the system and conserves energy.

The output of the pump system is provided to the hydraulic apparatus of the system through conduit 302. Conduit 302 is connected to conventional four-way, three position, spring centered valves 336, 338, 340, 342, and 344, all of which are connected in parallel across lines 302 and 304. These valves are actuated by solenoids SOL 1 and 2, 4 and 5, 7 and 8, 9 and 10, and 11 and 12, respectively, in order to drive their respective hydraulic cylinders in either of two directions. These valves operate only for purposes of establishing the direction of movement of the hydraulic cylinder and have no effect on the rate of movement of the cylinder.

The operation of the rotary motor and the main extend cylinder both incorporate hydraulic apparatus for controlling the acceleration and deceleration of the apparatus, because of the fact that the apparatus is heavy and possesses a substantial amount of kinetic energy when moving. Accordingly, it is necessary to first decelerate the apparatus before stopping it in order to properly control the movement of the apparatus and prevent damage to the apparatus.

On the other hand, the tooling extend cylinder, the tooling lift cylinder, and the grab cylinder all operate relatively light weight components, and it is sufficient that these components be controlled by switching means that stop the cylinders when they reach their fully extended and fully retracted positions. Since the kinetic energy of the tooling controlled by these components is relatively small, it is not necessary to provide acceleration apparatus for these cylinders. Deceleration is provided by adjustable cushions at each end of each of cylinders 181, 172, 192.

The acceleration and deceleration apparatus of the motor and main extend cylinders are substantially the same, so the operation of only one of these cylinders, namely, the hydraulic drive motor, will be described in detail herein.

Whenever a solenoid such as SOL 1 (clockwise rotation) is actuated, fluid passes from line 302 through line 346 through valve 336 to the hydraulic control apparatus for the motor. Without any other controls being effected at the same time, the fluid will pass from line 346 through a flow control valve 348 consisting of a parallel connected adjustable throat valve and a check valve. The fluid will then pass to a conduit 350 leading to hydraulic motor 64 for rotating the motor in a clockwise direction. The motor actuates the various limit switches indicated in order to accelerate, decelerate and stop the motor at various positions. Without further controls, the amount of fluid flowing through flow control valve 348 would be quite small so that the movement of the motor would be quite slow and at a constant velocity.

In order to provide for acceleration and deceleration of the motor to substantially higher velocities, flow control mechanism 352 is connected to the hydraulic motor and serves as a selective bypass for the check valves. Flow control mechanism 352 comprises a three position, spring centered, four way valve 354 connected across lines 302 and 304 by lines 356 and 357. This valve includes a single driving solenoid SOL 3, as only a single direction of flow is necessary. Hydraulic pressure is received in this valve through line 356, and when the solenoid is inoperative, the pressure is blocked at the center of the solenoid. When the solenoid is actuated, fluid flows upwardly through the valve and through a flow control valve 358 to a spool valve 359, which has a tapered spool and is operated by receipt of hydraulic pressure in either end thereof. When the fluid is received through the left end of valve 359, the valve spool tends to move toward the right (FIG. 9 orientation); however, the movement to the right is controlled by means of a flow control valve 360 connected to the right hand end of valve 359. The fluid passes through control valve 360 at a limited rate, so the spool moves only slowly to the right. The fluid passing through valve 360 then passes through valve 354 and back to return conduit 304 via conduit 357.

As the tapered spool in valve 359 moves to the right, the amount of flow of fluid through the valve in two directions is increased. Thus fluid coming to the pressure control valve through conduit 346 is permitted to pass through a separate conduit 362 through valve 359 and downwardly through conduit 350 to the hydraulic motor. Similarly, return fluid is permitted to flow from the other end of motor through conduit 364, through valve 359, and back to return line 306 via line 361. As valve 359 moves to the right, the valve bypasses flow control valve 348 and thereby provides a continuously increasing flow of hydraulic fluid to the hydraulic motor. This acts as an acceleration device and provides both continuous acceleration of the motor until the spool in valve 359 is moved all the way over to the right, at which time the velocity becomes constant.

The output of hydraulic motor 64 also effects a check on the acceleration of the motor. The output of the motor is connected to conduit 364, and this conduit leads in one path 367 through valve 359 to conduit 366 that leads directly back through directional control valve 336 to return line 304. Another branch 368 leads off conduit 364 through a separate flow control valve 370 into return line 366 leading back through valve 336. Thus, when the spool in valve 359 is in the position shown in FIG. 9, all return flow from hydraulic motor 64 must flow through flow control valve 370, and this flow is sufficiently small to prevent rapid movement of the motor.

As the spool in valve 359 moves to the right, flow control valve 370 also is bypassed by means of valve 359 and this permits a greater return flow of hydraulic fluid through conduit 364 from the hydraulic motor. This provides additional acceleration of the hydraulic motor.

Deceleration of the motor before stopping the motor is accomplished in a similar manner. Solenoid SOL 3 is deactuated by limit switches LS 2, 4, or 6 at any of the three deceleration positions in the operation described above. This causes the spool in solenoid SOL 3 to center, thus blocking further input through line 356. Valve 359 is a spring centered valve and attempts to center as soon as the driving pressure is removed from the ends thereof. The tapered spool in valve 359 thus begins to center when the power is withdrawn from solenoid SOL 3. The centering is not immediate, however, because of the back pressure created by flow control valves 358 and 360, which prevent rapid flows of hydraulic fluid to or away from valve 359. Thus, valve 359 centers slowly, gradually cutting off the bypass paths to and from the hydraulic motor. When the bypass path is completely cut off by the centering of valve 359, only the residual flow through control valves 348 and 370 operate the hydraulic motor. When the solenoid actuating valve 336 is deactuated, all flow to the rotary motor is cut off and the rotary motor is thus stopped.

The operation of the same device to effect counter-clockwise rotation of the hydraulic motor is just the opposite of the operation for clockwise rotation.

The main extend cylinder is accelerated and decelerated in a similar manner to the rotary hydraulic motor.

The velocity of the main extend cylinder and the hydraulic motor are shown in relation to the position of the elements in a graph in FIG. 6. This graph shows a continuous rate of acceleration until full speed is reached, at which time the apparatus proceeds along at full speed until it reaches its deceleration point. A limit switch is tripped at the deceleration point, disconnecting solenoid SOL 3 and the hydraulic mechanism slows down until it reaches the constant level permitted by the flow control valves. The main directional control valve is then deactuated and the cylinder or motor is stopped.

The tooling extend cylinder, lift cylinders, and grab cylinders are all actuated in a similar manner, except that no acceleration apparatus is provided.

There are provided separate adjustable flow control valves 380, 382, and 384 in the input and output lines in order to control the rate in which the various cylinders are extended or retracted. Limit switches at the extremities of the strokes of these cylinders operate to deactuate the directional control valves 340–344 when the cylinders reach the end of their strokes.

It should be understood that the embodiments disclosed herein are merely exemplary of the preferred practices of the present invention and that various modifications and changes may be made in the arrangements, details of construction, and operations of the apparatus of the present invention without departing from the spirit and scope of the present invention.

The embodiments of the invention in which an exclusive property or privilege is claimed are defined as follows:

1. In an industrial robot for manipulating a work piece, wherein a tooling assembly means for handling the work piece is mounted on a moveable manipulator, an improvement wherein the manipulator comprises:
   a base;
   a main support shaft pivotably mounted on the base for rotation about a substantially vertical axis;
   a non-circular main extend shaft having front and rear ends, with the front end comprising tool mounting means thereon for holding the tooling assembly means;
   support means including a support frame mounted on the support shaft and a bearing assembly means mounted on the support frame, said bearing assembly means being adapted to engage, support, and guide the main extend shaft for extension or retraction with respect to the support means in a generally horizontal, longitudinal direction, said bearing assembly means being further adapted to restrain the main extend shaft from vertical, lateral, or rotational movement with respect to the support frame, said bearing assembly means comprising a plurality of individual bearing means individually mounted in the support means and engaging the outer surface of the main extend shaft at a plurality of positions about the periphery of the main extend shaft, each said bearing means comprising a wheel rotatably mounted on an axle, with the axle being mounted in the support means such that the wheel engages the outer surface of the main extend shaft and rotates about an axis perpendicular to the longitudinal direction of movement of the main extend shaft, each said axle being eccentrically mounted in the support means with respect to the axis of rotation of the wheel and being selectively rotatable with respect to the support means, said selective rotation of the axle with respect to the support means serving to effect a position adjustment of the wheel with respect to the main extend shaft so as to adjust for wear and misalignment of the main extend shaft and bearing means;

selectively operable drive means adapted to rotate the support shaft and extend and retract the main extend shaft; and control means adapted to selectively operate the drive means.

2. An industrial robot as claimed in claim 1 wherein the main extend shaft comprises at least one flat surface that extends along the outside thereof, and the bearing assembly means engages said flat surface so as to provide resistance to torsional stresses placed on the main extend shaft.

3. An industrial robot as claimed in claim 2 wherein the main extend shaft has a rectangular cross-section and the bearing assembly means comprises separate bearing mechanisms that engage each of the four sides of the main extend shaft at at least two separate points on the support frame.

4. An industrial robot as claimed in claim 3 wherein the axles are mounted in the support frame by means of channel brackets on the support frame, said axles extending through the channel brackets to threaded inside ends thereof and being secured to the channel brackets by nuts that engage the threaded inside ends of the axle, each channel bracket having at least one open side thereof so as to permit easy access to the nuts for adjustment, installation, or removal of the bearing means.

5. An industrial robot as claimed in claim 1 wherein:
the base comprises an annular yoke surrounding the main support shaft;
the main support shaft comprises a collar extending around the periphery thereof at a point above the yoke; and
radial thrust bearing means surrounding the main support shaft rest on top of the yoke and are positioned between the yoke and the collar so as to engage and provide vertical support for the main support shaft, while at the same time providing a horizontal rotational bearing for the main support shaft.

6. An industrial robot as claimed in claim 1 wherein:
the drive means comprise drive motor means adapted to rotate the main support shaft in either direction and hydraulic main extend cylinder means adapted to extend and retract the main extend shaft; and
the control means comprise means for selectively actuating the drive motor means and the main extend cylinder means and limit switch means for deactuating the drive motor means and the main extend cylinder means, the limit switch means for the drive motor means being adjustable so as to permit deactuation of the motor at a variety of positions, the limit switch means for the main extend cylinder means being adapted to deactuate the main extend cylinder means at substantially full extend and substantially full retract.

7. An industrial robot as claimed in claim 6 wherein:
the drive means are hydraulically operated and comprise speed control means adapted to cause the drive motor means and main extend cylinder means to accelerate gradually to a constant speed upon actuation thereof and to decelerate gradually from said constant speed upon deactuation thereof;
the control means are adapted to actuate the speed control means when the drive motor or main extend cylinder is first actuated and to deactuate the speed control means a predetermined distance before the drive motor or main extend cylinder is to be stopped.

8. An industrial robot as claimed in claim 7 and further comprising shock absorber means adapted to stop the movement of the main extend shaft at the end of each full stroke and stop the main support shaft after a predetermined amount of rotary movement thereof.

9. An industrial robot as claimed in claim 1 wherein the tooling assembly means comprises:
a grab jaw frame;
a pair of juxtaposed, elongated grab jaws mounted in the grab jaw frame at points intermediate the ends thereof for pivotal movement about parallel axles, the grab jaws having opposed gripping surfaces at a front end thereof and cam surfaces formed on a back end thereof so as to give the back end of the grab jaws an inwardly tapered contour, the grab jaws having an open position, wherein the gripping surfaces are closed on a work piece;
resilient biasing means connected to the grab jaws and adapted to urge the grab jaws toward their closed position;
cam follower means adapted to open and close the grab jaws by engagement and disengagement with the cam surfaces on the grab jaws; and
hydraulic grab jaw cylinder means mounted in the tooling assembly and selectively operable by the control means of the industrial robot to cause the cam follower means to move into and out of engagement with the cam surfaces so as to open and close the grab jaws.

10. An industrial robot as claimed in claim 9 wherein:
the grab jaw frame is moveably mounted in the tooling assembly for vertical motion with respect to the tooling assembly; and
hydraulic lift cylinder means mounted in the moveable carriage are attached to the grab jaw frame and adapted to raise and lower the grab jaw frame and attached grab jaws, the operation of said lift cylinder means being controlled by the control means for the industrial robot.

11. An industrial robot as claimed in claim 10 wherein:
the grab jaw frame is mounted in a moveable carriage moveably mounted on the front end of the main extend shaft for horizontal movement in a longitudinal direction with respect to the main extend shaft; and
hydraulic tooling extend cylinder means are attached to the moveable carriage and are adapted to move the moveable carriage inwardly and outwardly with respect to the end of the main extend shaft, the operation of said tooling extend cylinder being controlled by the control means for the industrial robot.

12. An industrial robot for handling a work piece comprising:
a base;
a vertically disposed main support shaft mounted in the base;
a horizontally disposed main extend shaft having front and rear ends;
support means including a support frame and bearing assembly mounted on the main support shaft, said bearing assembly being adapted to engage and support the main extend shaft and guide the main extend shaft for longitudinal movement with respect to the support frame;

a tooling support mechanism mounted on the front end of the main extend shaft and extending horizontally outwardly therefrom;

a moveable carriage slidably mounted on the tooling support mechanism so as to be moveable in a longitudinal direction with respect to the main extend shaft;

a grab jaw frame mounted in the moveable carriage so as to be moveable in a vertical direction with respect to the moveable carriage;

a pair of opposed grab jaws pivotably mounted in the grab jaw frame, said grab jaws having an open and a closed position;

selectively operable drive means for rotating the main support shaft, extending and retracting the main extend shaft, extending and retracting the moveable carriage, raising and lowering the grab jaw frame, and opening and closing the grab jaws; and control means for selectively operating the drive means.

13. An industrial robot as claimed in claim 12 wherein the drive means comprises:

a motor drivingly connected to the main support shaft;

a hydraulic main extend cylinder mounted on the support frame and having an extendable rod extending from the main extend cylinder and being attached to the main extend shaft;

a hydraulic tooling extend cylinder having an extendable rod extending between the movable carriage and the main extend shaft;

a hydraulic tooling lift cylinder mounted on the moveable carriage and having an extendable rod extending between the moveable carriage and the grab jaw frame, the grab jaw frame being suspended from the extendable rod; and a hydraulic grab jaw cylinder mounted on the grab jaw frame and having an extendable rod that is drivingly connected to the grab jaws to as to cause the grab jaws to open and close as the extendable rod is reciprocated in the grab jaw cylinder.

14. An industrial robot as claimed in claim 13 wherein:

the grab jaws are juxtaposed elongated members pivotably mounted in the grab jaw frame at points between the ends thereof, with opposing surfaces on the front end of the grab jaws being gripping surfaces and with the back ends thereof comprising cam surface means, said cam surface means being adapted, upon engagement with a cam follower means, to cause the grab jaws to open and close; and the grab jaw cylinder is drivingly connected to a cam follower means positioned adjacent the cam surface means, said cam follower means being adapted, upon reciprocation of the extendable rod of the grab jaw cylinder, to engage the cam surface means so as to cause the grab jaws to open and close.

15. An industrial robot as claimed in claim 14 wherein:

the grab jaws are biased toward their closed position by a resilient biasing means connected to the grab jaws;

the cam surface means are adapted to cause the grab jaws to open when drivingly engaged by the cam follower means; and the cam follower means are moved into and out of driving engagement with the cam surface means by reciprocation of the grab jaw cylinder, thereby causing the grab jaws to open and close, respectively.

16. An industrial robot as claimed in claim 15 wherein the resilient biasing means is adjustable in order to adjust the gripping force exerted by the grab jaws on the work piece.

17. An industrial robot for manipulating a work piece comprising:

a base;

a main support shaft pivotably mounted on the base for rotation about a substantially vertical axis;

a hollow, rectangular main extend shaft having front and rear ends;

a support frame mounted on the support shaft;

at least two separate sets of bearings engaging each of the four walls of the main extend shaft at separate points along the longitudinal axis of the main extend shaft, said bearings being mounted in open channel brackets in the support frame and being positioned so as to permit longitudinal movement of the main extend shaft but restrain the main extend shaft from vertical, lateral, or rotational movement with respect to the support frame, said bearings also comprising eccentric mounting means adapted to permit manual adjustment of the position of each of the bearings to compensate for wear or misalignment;

a moveable carriage mounted on the front end of the main extend shaft for longitudinal movement with respect to the main extend shaft;

a grab jaw frame moveably mounted in the moveable carriage for vertical motion with respect to the moveable carriage;

a pair of juxtaposed, elongated grab jaws mounted in the grab jaw frame at points intermediate the ends thereof for pivotable movement about parallel axes, the grab jaws having opposed gripping surfaces at a front end thereof so as to give the back end of the grab jaws an inwardly tapered contour, the grab jaws having an open position, wherein the gripping surfaces are separated, and a closed position, wherein the gripping surfaces are closed on a work piece;

resilient biasing means connected to the grab jaws and adapted to urge the grab jaws toward their closed position;

cam follower means adapted, upon actuation, to engage the cam surfaces on the grab jaws so as to cause the grab jaws to open;

hydraulic grab jaw cylinder means mounted in the tooling assembly and connected to the cam follower means, said grab jaw cylinder means being adapted to move the cam follower means into an out of driving engagement with the cam surfaces of the grab jaws in order to open and close the grab jaws;

hydraulic motor means for rotating the main support shaft in either direction;

hydraulic cylinder means operating on a full extend and full retract basis for extending and retracting the main extend cylinder;

hydraulic tooling extend cylinder means extending between the moveable carriage and the main extend cylinder and adapted to extend and retract the moveable carriage with respect to the main extend cylinder;

hydraulic lift cylinder means mounted in the moveable carriage and attached to the grab jaw frame, said hydraulic lift cylinder means being adapted to raise and lower the grab jaw frame and attached grab jaws;

control means adapted to control the direction of and actuate and deactuate the hydraulic motor and each of the hydraulic cylinder means, said control means being adapted to actuate the hydraulic motor and cylinder means by means of solenoid controlled hydraulic valves, and said control means being adapted to deactuate the hydraulic motor and hydraulic cylinders by means of limit switches, said control means including acceleration and deceleration hydraulic controls for causing gradual acceleration and deceleration of the main extend shaft and main support shaft.

* * * * *